Patented Apr. 3, 1951

2,547,682

UNITED STATES PATENT OFFICE 2,547,682

NITROARYL ESTERS OF 2-MERCAPTO-THIAZINES AS HERBICIDES

Luther L. Baumgartner, Hastings on the Hudson, N. Y., assignor to The B. F. Goodrich Company, New York, N. Y., a corporation of New York No Drawing. Application March 4, 1950, Serial No. 147,752

7 Claims. (Cl. 71—2.5)

This invention relates to herbicidal compositions and more specifically pertains to the use of nitroaryl esters of 2-mercapto-1,3-thiazines (sometimes referred to hereinafter simply as 2-mercaptothiazines) as active ingredients in herbicidal compositions.

I have discovered that nitroaryl esters of 2-mercaptothiazines and compositions containing them are excellent herbicides. They are effective when used with a suitable carrier in solutions, aqueous dispersions, aqueous emulsions, and dusts and when employed in concentrations as low as 0.1% by weight. Compositions containing the ester in low concentrations of less than 1% by weight find use against weeds or undesirable plant growth in lawns and cultivated plots while compositions containing the ester in higher concentrations of 1 to 10% by weight can be employed to eradicate plant life of all kinds which is usually found in unpaved driveways, clay tennis courts, highway berms, vacant lots, drainage ditches, barn lots, along fence rows, etc. Plant life killed by such compositions includes species from such major families of the plant kingdom as Leguminosa, Cruciferae, Gramineae, Cucurbitaceae and Solanaceae and includes specifically such plant pests as, for example, crab grass, foxtail, ragweed, lamb's-quarters, oxalis, quackgrass, plantain, burdock, Japanese honeysuckle, dandelion, sheperd's purse, poison ivy, Canadian thistles and bindweed.

The nitroaryl esters of 2-mercaptothiazines generally possess the formulae

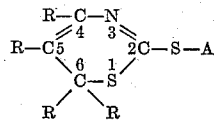

and

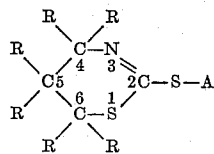

where each R represents a hydrogen atom or a hydrocarbon group and where A represents a nitroaryl radical, that is, a radical having one or more nitro, $NO_2$, groups substituted for one or more nuclear hydrogen atoms of an aryl hydrocarbon radical.

When an R group represents a hydrocarbon radical the radical may be aliphatic, alicyclic or aromatic in nature or any combination thereof; thus it may be an alkyl, cycloalkyl, aralkyl or aryl hydrocarbon radical. All the R groups may be the same or they may represent combinations of hydrogen atoms and hydrocarbon radicals. In addition, two hydrocarbon R groups may be connected to each other to form, together with carbon of the thiazine ring, a cyclic hydrocarbon radical. Examples of the R groups which can be present are hydrogen, methyl, ethyl, propyl, isopropyl, butyl, isobutyl, amyl, hexyl, heptyl, octyl, cyclohexyl, cyclopentyl, phenyl, naphthyl, tolyl, xylyl and others. In general, it is preferred that the R groups be hydrogen or lower alkyl radicals.

The A portion of the nitroaryl esters of 2-mercaptothiazines hereinbefore illustrated by the general formula can be any nitrosubstituted aryl hydrocarbon radical. For example, it may represent a mono-, di-, tri-, tetra-nitro phenyl group or such other nitroaryl groups as the various nitro biphenyl groups, nitro-tolyl groups, nitro-xylyl groups, nitro-cymyl groups, nitro-cumyl groups, or naphthyl groups. The preferred nitro-aryl radicals are those which contain no more than two nitro groups.

The nitroaryl esters of 2-mercaptothiazines can be easily and conveniently prepared by reacting the sodium salt of a 2-mercaptothiazine with a nitro-chloro aromatic compound thereby to form, by splitting out of sodium chloride, the desired ester. The reaction proceeds substantially to completion with yields of 90 to 99% especially when the reaction is carried out in the presence of a solvent such as an ether, an alcohol, a ketone or a liquid hydrocarbon. When the reaction is carried out in the presence of an organic solvent, the reactants are heated until reflux begins and the exothermic nature of the reaction maintains a reflux until the reaction has been completed. The nitroaryl ester can be thrown out of solution in a granular crystalline form by the addition of water to the reaction mixture after the reaction is complete.

Any of the 2-mercaptothiazines such as those disclosed in U. S. Patents 2,086,186, 2,271,400 and 2,440,095 may be so reacted with the appropriate nitro-chloro aromatic compound to form nitroaryl esters of 2-mercaptothiazines suitable for the herbicidal uses of this invention. Specific examples of such esters include the nitrophenyl, 2,4-dinitrophenyl, 3,5-dinitrophenyl and nitrotolyl esters of 2-mercapto-dihydrothiazine, 2-mercapto-benzothiazine, 2-mercapto-4,6,6-trimethyl thiazine and 2-mercapto-6-methyl-4,6-dipropyl thiazine.

The following example illustrates the preparation of the nitroaryl esters of 2-mercaptothiazines.

Example I

There was added to a two-liter, three-necked flask equipped with a dropping funnel, stirrer and reflux condenser 259.5 grams of 2-mercapto-4,6,6-trimethyl-1,3-thiazine, 306 grams of 2,4-dinitrochlorobenzene and 200 ml. of acetone. Then this solution was stirred and heated to reflux at which time 126 grams of an aqueous solution containing 63 grams of sodium hydroxide were added at such a rate to maintain the mixture at reflux temperature. When refluxing ceased indicating completion of the reaction, 750 ml. of water were added and the stirring was continued until crystallization occurred, at about 55° C. The crystalline product was recovered by filtration, washed with water and air dried. In this manner 502 grams, a 99% yield, of [2-thio-(2',4'-dinitrophenyl)]-4,6,6-trimethyl-1,3-thiazine were recovered having a melting point of 84° C. to 90° C.

The following examples illustrate the effectiveness of the nitroaryl esters of 2-mercaptothiazines as destroyers of plant life.

Example II

A solution containing 0.25% by weight of [2-thio-(2',4'-dinitrophenyl)] - 4,6,6-trimethyl-1,3-thiazine dissolved in a mixture consisting of 20% by volume of acetone and 80% by volume of insecticide grade kerosene was prepared. This solution was sprayed on growing tomato, radish, fescue grass and bean plants. In five days all the tomato, radish and bean plants were dead while the grass appeared unharmed. Since tomato, radish and bean plants are typical test species of the Solanaceae, Cruciferae and Leguminosa families, respectively, this example demonstrates that the herbicides of this invention in low concentrations rapidly kill many varieties of the plant kingdom without killing grasses.

Example III

An aqueous dispersion containing 1.0% by weight of [2-thio-(2',4'-dinitrophenyl)]-4,6,6-trimethyl-1,3-thiazine dispersed in a 1% aqueous solution of sodium lauryl sulfate was sprayed on a plot containing rapidly growing mixed weeds and grasses. Within a week after spraying substantially all of the plant life on the plot was dead.

This example demonstrates that the herbicides of this invention in higher concentrations are useful for weed abatement on highway berms, unpaved roads and driveways, tennis courts, drainage ditches, barnyard lots, etc.

Example II utilizes an aqueous colloidal dispersion of the active agent, the preferred type of herbicidal composition. Other such dispersions of nitroaryl esters of 2-mercaptothiazines can be prepared using such dispersing or wetting agents as, for example, those typified by the following general classifications: sodium and potassium salts of fatty acids known as soft and hard soaps; salts of disproportionated abietic acid known as rosin soaps; salts of the hydroxy-aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; quaternary ammonium alkyl halides; fatty acids saponified with amines and amino alcohols; and others. When one of these wetting or dispersing agents is employed to prepare an aqueous dispersion of nitroaryl esters of 2-mercaptothiazines, it is generally necessary to use only from about 0.1% to about 5% by weight of the wetting or dispersing agent based on the total amount of the dispersion.

Aqueous colloidal dispersions or emulsions can also be prepared by dissolving the nitroaryl ester of 2-mercaptothiazine in the smallest amount of organic solvent which will dissolve the quantity of active ingredient to be used. Then this solution is colloidally dispersed in water by mechanical means as with a homogenizer or by means of a suitable emulsifying agent.

In addition to the organic solutions and the aqueous compositions above-described, the nitroaryl esters of 2-mercaptothiazines can be employed as herbicides in dust compositions, that is, dispersed in a finely-divided pulverulent solid such as clays, talc, diatomaceous earths, etc. Wetting agents added to these dusts increase their effectiveness.

All these compositions have the common physical property of being in a flowable form so that they can be employed in spraying and dusting equipment. Accordingly, they all consist of the active agent incorporated in a fluent carrier.

In general, it is preferred to use compositions containing only 0.25% to 1.0% by weight of the nitroaryl esters of 2-mercaptothiazines. But compositions containing as little as 0.1% by weight or as much as 10% by weight can be used if desired. However, where the cost of the composition is a controlling factor, it will be found that compositions containing the active ingredients in the preferred range will be most satisfactory.

Having disclosed my invention and illustrated and demonstrated the results obtainable by following the invention disclosed, I claim:

1. A herbicidal composition comprising a nitroaryl ester of a 2-mercapto-1,3-thiazine, as an essential active ingredient, and a fluent carrier therefor.

2. A herbicidal composition comprising a nitrophenyl ester of a 2-mercapto-1,3-thiazine, as the essential active ingredient, and a fluent carrier therefor.

3. A herbicidal composition comprising a dinitrophenyl ester of a 2-mercapto-1,3-thiazine, as the essential active ingredient, and a fluent carrier therefor.

4. A herbicidal composition comprising [2-thio-(2',4'-dinitrophenyl)] - 4,6,6 - trimethyl-1,3-thiazine having the formula

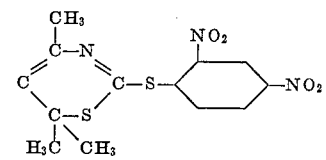

as the essential active ingredient, and a fluent carrier therefor.

5. The method of killing growing plant life which comprises uniformly applying thereto a lethal quantity of a composition containing at least 0.1% by weight of a nitroaryl ester of a 2-mercapto-1,3-thiazine.

6. The method of killing growing plant life which comprises uniformly applying thereto a lethal quantity of a composition containing at least 0.1% by weight of a nitrophenyl ester of a 2-mercapto-1,3-thiazine.

7. The method of killing growing plant life which comprises uniformly applying thereto a lethal quantity of a composition containing at least 0.1% by weight of [2-thio-(2',4'-dinitrophenyl)]-4,6,6-trimethyl-1,3-thiazine having the formula

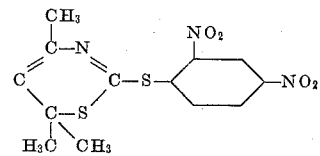

LUTHER L. BAUMGARTNER.

No references cited.